(12) United States Patent
Bencheikh

(10) Patent No.: US 8,812,050 B1
(45) Date of Patent: Aug. 19, 2014

(54) HANDOFF MANAGEMENT IN A MULTI-LAYER WIRELESS NETWORK

(75) Inventor: Ahmed Bencheikh, Fairfax Station, VA (US)

(73) Assignee: Time Warner Cable Enterprises LLC, New York, NY (US)

(*) Notice: Subject to any disclaimer, the term of this patent is extended or adjusted under 35 U.S.C. 154(b) by 501 days.

(21) Appl. No.: 13/101,931

(22) Filed: May 5, 2011

(51) Int. Cl.
*H04B 7/00* (2006.01)

(52) U.S. Cl.
USPC ........ 455/525; 455/435.2; 455/436; 455/441; 370/331

(58) Field of Classification Search
USPC ........ 455/432.1, 435.2, 435.3, 436–444, 525; 370/331, 332
See application file for complete search history.

(56) References Cited

U.S. PATENT DOCUMENTS

| | | | | |
|---|---|---|---|---|
| 5,396,253 A | * | 3/1995 | Chia | 342/104 |
| 5,673,307 A | * | 9/1997 | Holland et al. | 455/436 |
| 5,787,348 A | * | 7/1998 | Willey et al. | 455/441 |
| 5,913,168 A | * | 6/1999 | Moreau et al. | 455/441 |
| 7,522,995 B2 | * | 4/2009 | Nortrup | 701/425 |
| 8,213,381 B2 | * | 7/2012 | Hayashi | 370/331 |
| 2006/0153124 A1 | * | 7/2006 | Kant et al. | 370/328 |
| 2009/0191878 A1 | * | 7/2009 | Hedqvist et al. | 455/441 |
| 2009/0279507 A1 | * | 11/2009 | Kanazawa et al. | 370/332 |
| 2010/0085938 A1 | * | 4/2010 | Chen et al. | 370/331 |
| 2010/0210301 A1 | * | 8/2010 | Dietz et al. | 455/556.1 |
| 2010/0260068 A1 | * | 10/2010 | Bhatt et al. | 370/254 |
| 2011/0080825 A1 | * | 4/2011 | Dimou et al. | 370/216 |
| 2011/0142006 A1 | * | 6/2011 | Sachs | 370/331 |
| 2011/0188472 A1 | * | 8/2011 | Jeon et al. | 370/331 |

* cited by examiner

*Primary Examiner* — Sujatha Sharma
(74) *Attorney, Agent, or Firm* — Chapin IP Law, LLC

(57) ABSTRACT

One or more short-range base stations in a network environment provide a substantially smaller coverage area than a long-range base station. The coverage area provided by each of the short-range base stations fully resides within or at least partially overlaps with the coverage provided by the long-range base station. Handoffs from the long-range base station to a respective short range base station, and vise versa, can be conditional on any number of one or more factors such as a speed of a mobile device through the network environment, a type of application and/or type of data transmitted over a respective communication link between the mobile device and the long-range base station, presence of one or more radio frequency layers in the network environment, mapping of a location of the mobile device to a speed limit value derived from a geographical map, etc.

19 Claims, 12 Drawing Sheets

HANDOFF MANAGEMENT IN A MULTI-LAYER WIRELESS NETWORK

BACKGROUND

Conventional cellular network technology has been used for many years to connect wireless devices such as phones, laptops, etc., to a landline network and other wireless networks. Today, such wireless networks support many different types of connection services such as voice communications, high-speed data services, WI-FI connectivity, and so on.

Conventional cellular networks typically include a land area that has been divided into so-called cellular regions. A single base station typically resides in each cell. The base station is connected to a land-line network and supports communication with one or more wireless subscribers operating in a region covered by the cell. Accordingly, a wireless subscriber is able to communicate with a landline through a wireless link between the subscriber and a base station.

A subscriber may move in the wireless network environment. In order to provide continuous connectivity to a wireless subscriber, conventional base stations facilitate a handoff of the link to a neighboring cell in the event that a subscribers moves out of one cell and into another.

In general, as the traffic demand in a wireless network increases, it is possible that the cell size (or radius of communication) will continue to shrink as more and more small cells with short range of coverage may be needed to offload a macro network. Having a multi-layer network with short-range cells and long-range cells imposes some challenges for the handoff performance.

More recent wireless technology includes so-called pico base stations. Conventional pico base stations typically provide short-range wireless coverage compared to conventional long-range base stations. As an example, a pico base station may provide radial coverage on the order of 200-300 meters. A long-range base station may provide wireless coverage on the order of a mile or more. It is now becoming more common to implement one or more pico base stations within a wireless region supported by a long-range base station. The long-range base station hands off a respective link to a pico base station if a wireless subscriber is in a vicinity of coverage provided the pico base station. Handoff of a wireless device and link to the pico base station frees up RF bandwidth associated with the long-range base station.

BRIEF DESCRIPTION OF EMBODIMENTS

Conventional wireless communication systems suffer from a number of deficiencies. For example, conventional communication systems typically hands off wireless devices from a long-range base station to a corresponding pico-range base station when the wireless device is in close proximity to a wireless coverage supported by the pico base station. However, if the wireless mobile device travels at a relatively high speed such as above 30 miles per hour, many handoffs may need to be performed with the long-range base station and other pico base stations to keep the wireless mobile device connected to the overall network. For example, in conventional wireless networks, the handoff decision is mainly driven by the signal strength. One issue with conventional networks is that when a wireless network is configured to include cells of smaller cell size, the ratio of handoff failure and a so-called ping-pong handoff effect will increase if the user is moving above a certain speed and handing off from one pico station to another or from a pico station to a macro station. Thus, pico base stations may not be suited for high-speed applications.

Embodiments herein deviate with respect to conventional applications. For example, embodiments herein are directed to unique ways of facilitating wireless handoffs in a network environment including one or more long-range base stations and one or more short-range base stations. More specifically, handoffs from a long-range base station to a short range (or vise versa) can be conditional on any number of one or more factors such as a speed of a mobile device, a type of application and/or type of data transmitted over a respective communication link between the mobile device and a base station, presence of one or more RF (Radio Frequency) layers in the network environment as provided by the long-range and short-range base stations, mapping of a location of the mobile to a speed limit value derived from a geographical map, etc.

As an example, one embodiment herein includes a long-range base station and a wireless device operating in a network environment. The network can further include one or more additional short-range base stations configured to provide a substantially smaller coverage area than the long-range base station. In one embodiment, the coverage area provided by each of the short-range base stations resides fully within or at least partially overlaps with the coverage provided by the long-range base station.

Via a communication link, the wireless device is able to communicate with the long-range base station. When the mobile wireless device is in a location in a network environment in which the mobile wireless device is in a vicinity of coverage provided by both a long-range base station and a short-range base station, the communication link can be conditionally handed off of to the short-range base station or from the short-range base station to the long-range base station depending on one or more factors as previously discussed. As an example, the handoff can be initiated from the long-range base station to the short-range depending on a speed of the wireless device.

Note that embodiments herein include a handoff manager (e.g., electronic circuitry, software application, etc.) to facilitate handoffs in with wireless network environment. The handoff manager can be located in any of one or more suitable resources such as the wireless device, in one or more long-range and short-range base stations, combination of wireless device and base stations, etc.

Embodiments herein further include enabling communications over a communication link between a first base station and a wireless device in a network environment. Handoff circuitry detects that the wireless device moves in a vicinity of coverage provided by a second base station located in the network environment. The handoff circuitry selectively initiates a wireless handoff of the communication link from the first base station to the second base station depending on a speed of the wireless device and a type of data transmitted over the communication link between the wireless device and the first base station. For example, in one embodiment, if the speed is above a threshold value and type of data transmitted over the communication link is latency-sensitive data, the handoff does not take place from the first base station to the second base station. If the speed is below a threshold value and type of data transmitted over the communication link is latency-sensitive data, the handoff of the communication link takes place from the first base station to the second base station.

In one embodiment, while the wireless device is connected to a long-range base station, the handoff manager monitors a movement of the wireless device in the network environment and detects when the mobile wireless device moves in a vicinity of coverage provided by a short-range base station also located in the network environment. As previously discussed, the short-range base station can be configured to provide a substantially smaller region of coverage as compared to a region of coverage provided by the long-range base station.

In this example embodiment, the handoff manager selectively initiates a wireless handoff of the communication link from the long-range base station to the short-range base station depending on a type of data transmitted over a communication link between the wireless device and the long-range base station. For example, the communication link between the wireless device and long-range base station can be a link supporting latency sensitive data such as voice data or non-latency sensitive data such as web data. When the communication link is in an active session transmitting latency sensitive data, the handoff manager prevents handoff of the communication link from the long-range base station to the short-range base station. Alternatively, the handoff manager can be configured to allow handoffs of communication links from the long-range base station to the short-range base station when the active communication link supports non-latency sensitive data. Accordingly, embodiments herein include enabling a handoff depending on a type of the data or type of link between a base station and the mobile wireless device (e.g., a wireless device).

Thus, different layers of a wireless network can maintain multiple links at the same time and send different bits/application data through different links/networks. For example, a wireless device can be simultaneously connected via separate links to both a long-range base station and a short-range base station. The link between the long-range base station and the user device may support voice data while non-voice type of data packets are sent on a link between the user device and the short-range base station. This enables the benefit of the short-range network by offloading the data traffic that is not latency sensitive but generates a heavy load on the network while maintaining voice communications over links to the long-range base station.

In addition to data type, note that the handoff manager can selectively initiate handoffs amongst base stations depending on a type of application executed by the wireless device.

In accordance with yet further embodiments, the wireless device is in communication with a long-range base station. The handoff manager detects when the wireless device moves in a vicinity of coverage provided by a short-range base station. As previously discussed, the short-range base station can be configured to provide a substantially smaller region of coverage within a region of coverage provided by the long-range base station.

In this embodiment, the handoff manager selectively initiates a wireless handoff of the communication link from the long-range base station to the short-range base station depending on a magnitude of speed of the wireless device (or subscriber) in the network environment. For example, if the wireless device moves at a relatively low speed in a vicinity of or through a coverage region provided by a short-range base station, the handoff manager initiates a handoff of the communication link to the short-range base station.

On the other hand, if the mobile wireless device moves at a relatively high speed in a vicinity of or through the coverage region provided by the short-range base station, the handoff manager does not initiate a handoff of the communication link to the short-range base station but maintains the communication link with the long-range base station. This latter case of maintaining a connection with a long-range base station and preventing handoffs depending on a speed of the wireless device can reduce high numbers of handoffs in a region including many short-range base stations.

In accordance with yet further embodiments, the handoff manager can be configured to enable handoffs depending on a type of geographical region such as whether a respective region (in which the wireless device resides) supports fast or slow moving subscribers. For example, in one embodiment, the handoff manager can be configured to identify a location or whereabouts of the wireless device in the network environment. The handoff manager can be configured to map the location to a respective speed value for a region in which the subscriber (e.g., wireless device) resides. The speed value retrieved from the mapping can indicate attributes of the location such as a speed limit of vehicles in or near the location, a typical, historical, and/or maximum speed of subscribers passing near or through the location, etc.

The handoff manager selectively initiates a wireless handoff of the communication link from a long-range base station to a short-range base station based at least in part on a magnitude of the speed value retrieved from the mapping. For example, if the speed value indicates that subscribers typically or often move slowly or below a threshold value through the location or surrounding region, then the handoff manager can initiate a handoff of a communication link with the wireless mobile device from the long-range base station to a nearby short-range base station. In such an instance, it is likely that the wireless device will remain within range of the short-range base station for a reasonably long duration of time. On the other hand, if the speed value retrieved from mapping indicates that subscribers typically move through the location or surrounding region above a threshold value, the handoff manager can prevent a handoff of the communication link to a short-range base station.

In accordance with further embodiments, a wireless mobile device operating in a respective wireless network environment can receive a neighbor list indicating a set of base stations in a vicinity of a wireless device in the network environment. Via identifiers, the neighbor list can indicate that at least a portion of the set of base stations are short-range base stations and that at least a portion of the set of base stations are long-range base stations. Each of the short-range base stations can be configured to provide a substantially smaller region of coverage within a region of coverage provided by the long-range base stations. Embodiments herein include forwarding the neighbor list and identifier values enables the wireless device to identify which base stations are long-range base stations and which base stations in the list are short-range base stations.

In one embodiment, the neighbor list indicates candidate stations to which a handoff can be made from the current cell to which the wireless mobile device is connected. The identifier values or tags associated with the base stations listed in the listing indicate whether the neighbor base station is a long-range base station, short-range base station, etc. By way of a non-limiting example, the tags and/or identifier values can be included in the listing to indicate the type of neighboring base station for possible handoff. In accordance with such an embodiment, the handoff manager in the wireless mobile device can selectively initiate a request to handoff of the communication link to a short-range base station specified in the list depending on one or more attributes such as speed of the wireless device through the network environment, type of data on transmitted on an active link between the wireless mobile device and a respective base station in the network environment, typical speed or speed limit of subscriber in a vicinity of the wireless mobile device, etc.

In yet further embodiments, handoff techniques as discussed herein can be performed at least in part depending on ownership of different layers in a wireless network environment. For example, a first company may control (e.g., own, operate, etc.) one or more long-range base stations in a first network layer. At a second layer beneath the first layer, a second company may control (e.g., own, operate, etc.) one or more short-range base stations that operate within a vicinity of coverage provided by a given long-range base station controlled by the first company in the first layer.

A wireless subscriber may pay a fee to the second company to use the base stations at the second layer. Embodiments herein can include an agreement (e.g., a roaming agreement) between the first company and second company such that a respective wireless device can connect to the long-range base stations at the first layer when a respective link cannot be made between the wireless device and a respective short-range base station controlled by the second company at the second layer. In such an instance, the second company may pay a fee to the first company for wireless services between the wireless device and the first network layer such that the wireless device can connect to the base station at the first layer. This fee for use of one or more base stations in the first layer can be passed on to the user of the wireless device.

To reduce the cost of using the long-range base station in the first network layer, embodiments herein can include forcing the wireless device to handoff a link to a respective short-range base station or maintaining a connection with a short-range base station in the second network layer (as controlled by the second company) when possible even if a connection between the wireless device and a long-range base station in the first network layer would provide a better link w a respective wireless device. As long as the one or more short-range base stations in the second layer provide acceptable link quality with the wireless device, the wireless device stays connected with the second network layer as opposed to switching to the first network layer. However, as discussed herein, a handoff from a short-range base station to a long-range base station can be made in cases in which the wireless device and the network supports latency sensitive data traffic or in cases in which a speed of the wireless device is above a threshold value.

In addition to or as an alternative to including a base station type identifier (e.g., to indicate whether a base station is a long-range or short-range base station) in a neighbor list as previously discussed, embodiments herein can include a network identifier value to indicate to which network a respective base station resource belongs. For example, a network identifier value in a listing can indicate a company, entity, etc., that controls the respective base station. The wireless device can be configured to make handoff decisions based at least in part on whether the base station resource in the neighbor list is part of the network to which the wireless device is subscribed. For example, if the wireless device is subscribed to the use resources of the second company, the wireless device relies on a link between the wireless device and a base station controlled by the second company even if a base station controlled by a first company provides a better link option. As discussed above, a handoff can be performed as necessary or desired to maintain a link between a wireless device and a network.

These and other more specific embodiments are disclosed in more detail below.

Note that embodiments herein can include a configuration of one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

For example, one embodiment includes a computer readable storage medium having instructions stored thereon for managing handoffs in a wireless network environment; the instructions, when executed by a processor of a respective computer device, cause the processor or multiple processors to: initiate communications over a communication link between a long-range base station and a wireless device in a network environment; detect that the wireless device moves in a vicinity of coverage provided by a short-range base station located in the network environment, the short-range base station configured to provide a substantially smaller region of coverage as compared to a region of coverage provided by a long-range base station; and selectively initiate a wireless handoff of the communication link from the long-range base station to the short-range base station depending on a type of data transmitted over a communication link between the wireless device and the long-range base station.

Yet another embodiments herein includes a computer readable storage medium having instructions stored thereon for managing handoffs in a wireless network environment; the instructions, when executed by a processor of a respective computer device, cause the processor or multiple processors to: initiate communications over a communication link between a long-range base station and a wireless device in a network environment; detect that the wireless device moves in a vicinity of coverage provided by a short-range base station located in the network environment, the short-range base station configured to provide a substantially smaller region of coverage within a region of coverage provided by the long-range base station; and selectively initiate a wireless handoff of the communication link from the long-range base station to the short-range base station depending on a magnitude of speed of the wireless device in the network environment.

Yet another embodiments herein includes a computer readable storage medium having instructions stored thereon for managing handoffs in a wireless network environment; the instructions, when executed by a processor of a respective computer device, cause the processor or multiple processors to: identify a location of a wireless device in a wireless network environment; map the location to a speed value; and selectively initiating a wireless handoff of a communication link with the wireless device from a long-range base station to a short-range base station based at least in part on the speed value.

Yet another embodiments herein includes a computer readable storage medium having instructions stored thereon for managing handoffs in a wireless network environment; the instructions, when executed by a processor of a respective computer device, cause the processor or multiple processors to: communicate with a long-range base station over a communication link between the wireless device and the long-range base station; receive a neighbor list indicating a set of base stations in a vicinity of a wireless device in the network environment, the neighbor list indicating that at least a portion of the set of base stations are short-range base stations, each of the short-range base stations configured to provide a substantially smaller region of coverage within a region of coverage provided by the long-range base station; and selectively initiate a request to handoff of the communication link to a short-range base station specified in the list depending on a speed of the wireless device in the network environment.

The ordering of the steps above has been added for clarity sake. These steps can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for use in applications such as handoffs in a wireless network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As mentioned above, according to embodiments herein, one or more short-range base stations in a network environment provide a substantially smaller coverage area than a long-range base station also in the network environment. The coverage area provided by each of the short-range base stations can either reside fully within or at least partially overlap with the coverage provided by the long-range base station. Based on the overlapping of wireless coverage, it is possible to communicate with a wireless device via a long-range base station or a short-range base station.

As will be discussed in more detail below, handoffs from the long-range base station to a respective short range base station (or vise versa) can be conditional on any number of one or more factors such as a speed of a mobile wireless device traveling through the network environment, nearness of the mobile wireless device to a short-range base station, a type of application and/or type of data transmitted over a respective communication link between the mobile wireless device and the long-range base station, presence of one or more radio frequency layers or zones in the network environment, mapping of a location of the mobile wireless device to a speed limit value derived from a geographical map, etc.

Figure 1:
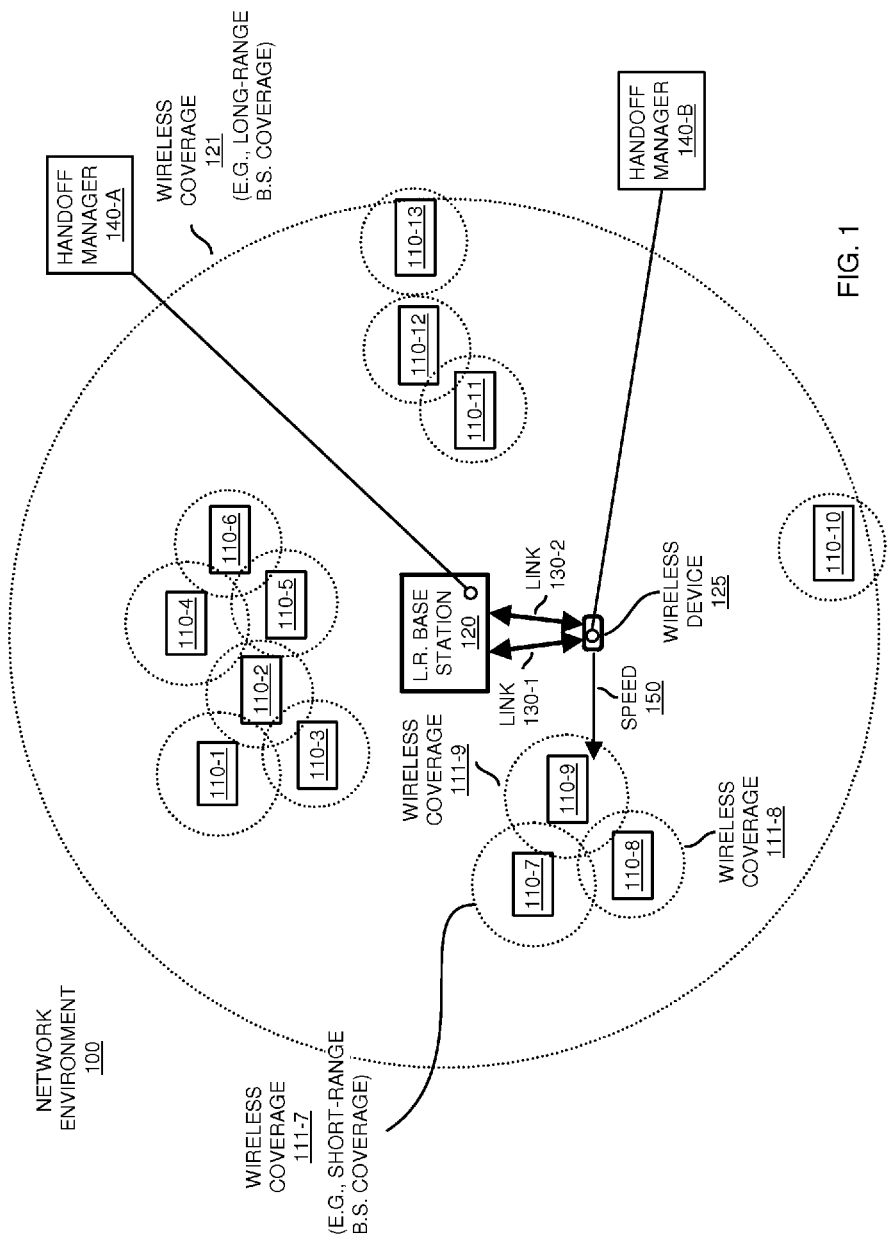
FIG. 1 is an example diagram of a network environment providing wireless connectivity and conditional handoffs according to embodiments herein.

FIG. 1 is an example diagram illustrating topographical view of network environment 100 according to embodiments herein.

As shown, network environment 100 includes at least one long-range base station as well as multiple short-range base stations.

Long-range base station 120 in network environment 100 provides wireless coverage 121 to one or more wireless devices or subscribers operating in network environment 100. In general, the wireless coverage 121 indicates a geographical region in which the long-range base station 120 is able to communicate with any of one or more wireless devices within its range.

As shown, in addition to one or more long-range base stations, network environment 100 can include one or more short-range base stations 110. Short-range base stations 110 (e.g., short-range base station 110-1, short-range base station 110-2, short-range base station 110-3, short-range base station 110-4, short-range base station 110-5, . . . ) in network environment 100 support a smaller range of connectivity than the long-range base stations.

In this example, short-range base station 110-7 supports a range of wireless coverage 111-7, short-range base station 110-8 supports a range of wireless coverage 111-8, short-range base station 110-9 supports a range of wireless coverage 111-9, and so on.

In geographical regions where the wireless coverage provided by a respective short-range base station overlaps with coverage by the long-range base station 120, it is possible to communicate with a respective wireless device via either the respective short-range base station or the long-range base station or possibly both. That is, when a wireless device resides within the wireless coverage 111-7, it is possible to communicate with the wireless device 125 via short-range base station 110-7 or long-range base station 120; when a wireless device 125 resides within the wireless coverage 111-8, it is possible to communicate with the wireless device 125 via short-range base station 110-8 or long-range base station 120; when a wireless device resides within the wireless coverage 111-9, it is possible to communicate with the wireless device 125 via short-range base station 110-9 or long-range base station 120; and so on.

In one embodiment, the long-range base station 120 provides at least double the wireless coverage area provided by one or more short-range base stations 110. That is, by way of a non-limiting example, the long-range base stations 120 in network environment 100 can be configured to support connectivity with wireless devices up to a half of a mile or more away; the short-range base stations 110 in network environment 100 can support connectivity with wireless devices such as up to 100 yards or more away. Accordingly, one or more short-range base stations can be configured to provide a substantially smaller coverage area (e.g., less than half the coverage) than coverage provided by a respective long-range base station.

Note further that each base station (short-range or long-range) can be configured to provide wireless coverage via deployment of any type of antenna system. For example, each base station can be configured with omni-directional antennas, beamforming antennas, directional antennas, etc., in order to communicate with respective wireless devices in the network environment 100.

Additionally, note that the wireless connectivity between a respective base station (long-range or short-range) and wireless device 125 can support one or more different kinds of communications. That is, the data transmitted on a respective wireless communication link can be different types such as latency sensitive data, latency insensitive data, high bandwidth data, low bandwidth data, etc. As a more specific example, communication links can support any type of voice data, hi-speed web-based data, etc.

Both the long-range base stations and short-range base stations in network environment 100 can be interconnected with each other and support handoffs. For example, communications amongst the base stations enable the handoff of a communication link with a moving wireless device 125 from one base station to another. Typically, the handoffs are performed in a manner such that a user of a respective wireless device is unaware of the handoff. That is, the user typically does not experience a disruption of service with a respective base station even though a handoff occurs.

Via a respective communication link, a resource such as the wireless device 125 is able to communicate with either the long-range base station or short-range base station if there is overlapping coverage. Accordingly, when the mobile wireless device is in a location in which the mobile wireless device is in a vicinity of both a long-range base station and a short-range base station, the communication link can be handed off of to the short-range base station or from the short-range base station to the long-range base station depending on one or more factors as previously discussed.

In this example, assume that wireless device 125 moves through the network environment 100 at a respective speed 150. Speed 150 may be one factor used by the handoff manager 140 to determine whether or not to allow a handoff to a short-range base station or prevent a handoff to the short-range base station. The speed 150 may also be used as a factor as to whether to allow a handoff from a short-range base station 110-9 to another short-range base station 110-7 or long-range base station 120.

As previously discussed, embodiments herein include a handoff manager 140 to facilitate handoffs. The handoff manager 140 can be located in any of one or more suitable resources such as the wireless device 125 (e.g., as handoff manager 140-B), in long-range base station 120 (e.g., as handoff manager 140-A), a combination of both base stations, etc. Thus, note that the following additional discussion of the handoff manager 140 can take place in either the wireless device, base station, one or more base stations, in a combination of these resources, etc.

In one embodiment, the wireless device 125 is in communication with the long-range base station 120 via one or more communication links 130 (e.g., communication link 130-1, communication link 130-2, . . . ). Each communication link can support transmission of the same or different type of data.

The handoff manager (in either or both the wireless device and base station 120) monitors a movement of the wireless device 125 in the network environment 100 and detects when the mobile wireless device 125 moves in a vicinity of wireless coverage 111-9 provided by a short-range base station 110-9 also located in the network environment 100. As previously discussed, the short-range base station 110-9 can be configured to provide a substantially smaller region of wireless coverage 111-9 as compared to a region of wireless coverage 121 provided by the long-range base station 120.

As will be discussed in the following example figures, the handoff manager 140 can facilitate handoff of one or more respective communication links 130 depending on any number of one or more factors such as a type of data transmitted on a communication link 130, a speed of the wireless device 125, a geographical speed value derived from a map, neighbor base station listing, etc.

Figure 2:
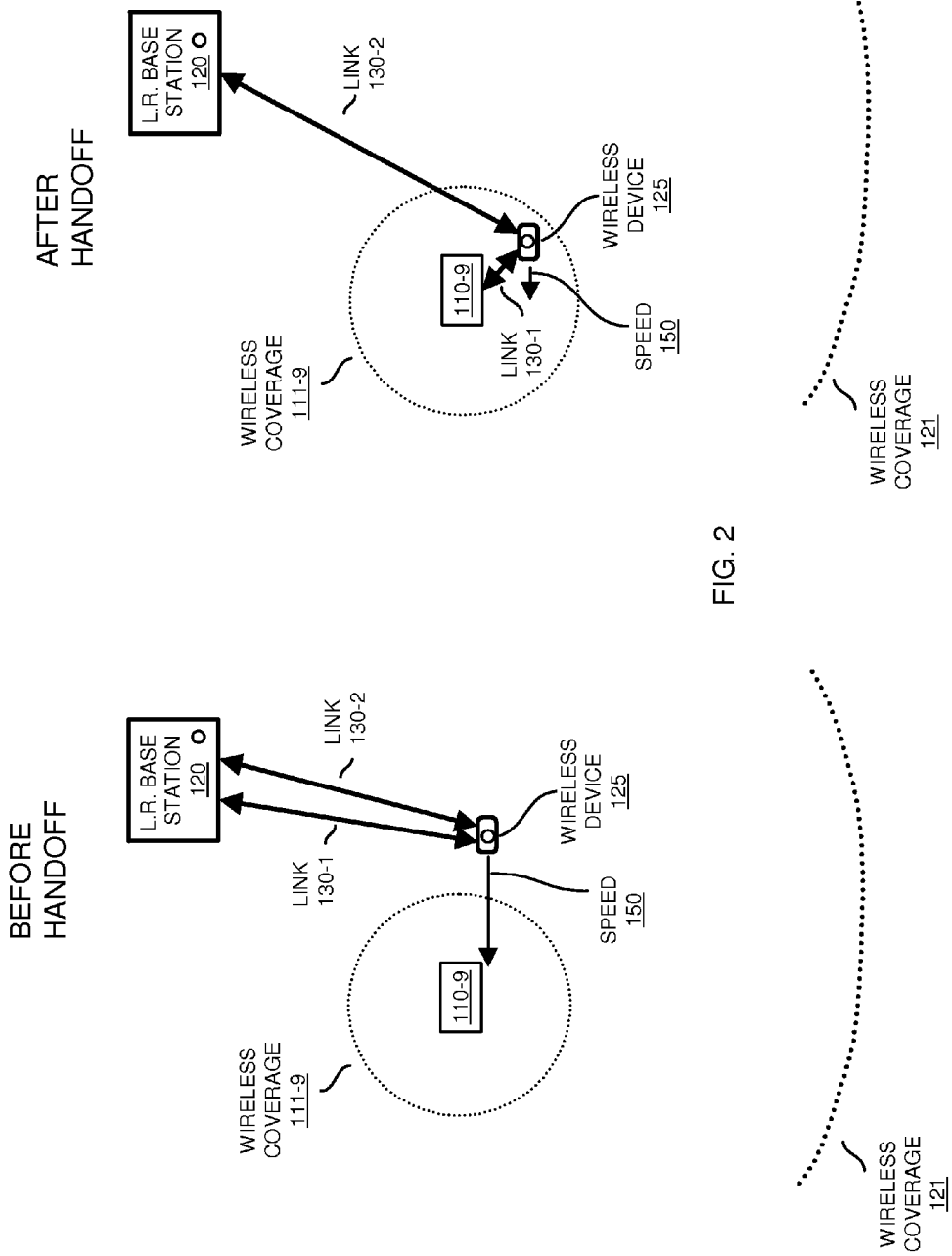
FIGS. 2-4 are example diagrams illustrating conditional handoffs of one or more wireless links according to embodiments herein.

FIG. 2 is an example diagram illustrating handoff of one or more communication links according to embodiments herein.

In this example embodiment, the handoff manager 140 selectively initiates a wireless handoff of one or more of the communication links 130 from the long-range base station 120 to the short-range base station 110-9 depending on a type of data transmitted over the communication links 130 between the wireless device 125 and the long-range base station 120.

More specifically, in this example, assume that the communication link 130-2 is a link supporting latency sensitive data such as voice data. Assume further that the communication link 130-1 supports non-latency sensitive data such as web data.

In this example embodiment, the handoff manager 140 monitors a location of the wireless device 125. This can be done via a number of methods such as via navigation circuitry such as GPS (Global Positioning System) circuitry in the wireless device 125, a strength of signals from neighboring base stations as detected by the wireless device 125, etc.

Eventually, the wireless device 125 moves in close proximity to or within the wireless coverage 111-9 associated with base station 110-9. As shown in FIG. 2, the handoff manager 140 prevents handoff of the communication link 130-2 when the wireless device moves within the wireless coverage 111-9 because the communication link 130-2 supports an active session such as a phone call (latency sensitive data) between the wireless device 125 and the long-range base station 120. While the wireless device 125 moves through the region of wireless coverage 110-9 provided by the short-range base station 110-9, the handoff manager 140 also maintains the communication link 130-2 between the wireless device 125 and the long-range base station 120.

However, in this example, recall that communication link 130-1 supports non-latency sensitive data. In this latter case, when the wireless device 125 is in a vicinity of the wireless coverage 111-9 provided by short-range base station 110-9, the handoff manager 140 allows the handoff of communication link 130-1 from the long-range base station 120 to the short-range base station 110-9 because the active communication link 130-1 supports non-latency sensitive data.

Accordingly, embodiments herein include enabling a handoff depending on a type of the data or type of link between a base station and respective mobile wireless device.

In accordance with another embodiment, in addition to data type, note that handoff manager 140 can facilitate handoffs of communication links 130 depending on any of the one or more criteria as discussed herein such as speed. For example, in addition to receiving data type information, the handoff manager 140 can receive speed information indicating a speed at which the wireless device 125 moves in the vicinity of wireless coverage 111-9 provided by short-range base station 110-9.

In response to detecting that a magnitude of the speed of the wireless device 125 is above a threshold value such as 30 miles per hour, the handoff manager 140 can prevent a wireless handoff of all communication links 130 from the long-range base station 120 to the short-range base station 110-9. At such a high speed, it is likely that handing off to the short-range base station would not be efficient because the wireless device 125 will not likely reside in wireless coverage 111-9 for very long (e.g., less than several seconds) at such a higher rate of speed.

On the other hand, in response to detecting that a magnitude of the speed of the wireless device 125 is below a threshold value such as 30 miles per hour, the handoff manager 140 initiates a wireless handoff of both links 130. For example, the handoff manager can initiate handoff of any communication links 130 of a particular type (e.g., communication links supporting latency sensitive data) from the long-range base station 120 to the short-range base station 110-9 if the speed of the wireless device 125 is below a threshold value.

Accordingly, the handoff manager 140 can initiate handoffs in the network environment 100 depending on multiple factors such as speed of the wireless device 125 and type of transmitted data. As mentioned above, handoffs can be contingent upon other factors as well.

Figure 3:
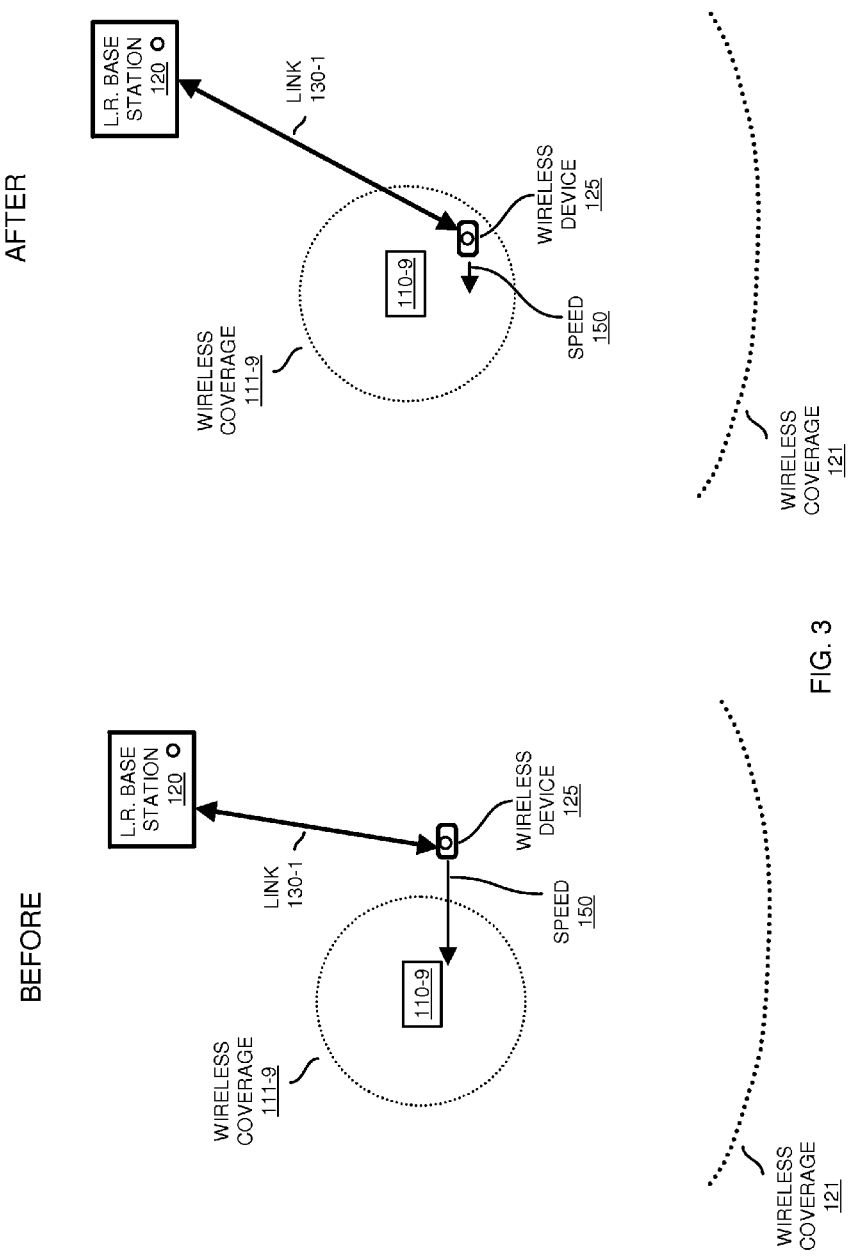

FIG. 3 is an example diagram illustrating handoff a communication link in network environment depending on speed according to embodiments herein.

Recall that detecting speed of the wireless device 125 can be done via a number of methods such as via a GPS circuitry in the wireless device 125, a strength of signals from neighboring base stations as detected by the wireless device, etc.

The wireless device 125 can produce the speed information and transmit it to the long-range base station 120. The wireless device 125 also can forward location information to the long-range base station 120. Based on the difference in location of the wireless device 125 over time, the long-range base station 120 can calculate the speed of the wireless device 125. Note that these are non-limiting and that any suitable method of determining speed can be used.

Assume in this example of FIG. 3 that the mobile wireless device 125 is in communication with long-range base station 120. The handoff manager 140 detects when the wireless device 125 moves in a vicinity of wireless coverage 111-9 provided by short-range base station 110-9 also located in the network environment 100. As previously discussed, the short-range base station 110-9 is configured to provide a substantially smaller region of wireless coverage 111-9 within a region of wireless coverage 121 provided by the long-range base station 120.

In this embodiment, the handoff manager 140 selectively initiates a wireless handoff of the communication link 130-1 from the long-range base station 120 to the short-range base station 110-9 depending on a magnitude of speed 150 of the wireless device 125 in the network environment 100. That is, the decision whether to prevent or initiate a handoff can depend on whether the speed 150 of the wireless device 125 is above or below a threshold value. Although the threshold value can be selected from a range such as between 20 and 40 miles per hour, the threshold value for determining whether to perform a handoff can be any suitable value and may change depending on the application and wireless coverage provided by the respective base stations in network environment 100.

Assume that the wireless device 125 moves at a relatively high speed 150 (e.g., above a threshold value) in a vicinity of or through the wireless coverage 111-9 provided by the short-range base station 110-9. Because the speed of the wireless device 125 is above a threshold value, the handoff manager 140 does not initiate a handoff to the short-range base station 110-9. Thus, even though the wireless device 125 or long-range base station may sense that the short-range base station 110-9 can provide better quality connectivity than the long-range base station, instead of initiating a handoff, the handoff manager 140 prevents the handoff and maintains the communication link 130-1 from the long-range base station 120 to the short-range base station 110-9. As previously mentioned, maintaining a connection with a long-range base station 120 and preventing handoffs depending on a speed 150 of the wireless device 125 can reduce high frequency, repeated and undesirable handoffs in a wireless region including many short-range base stations.

Figure 4:
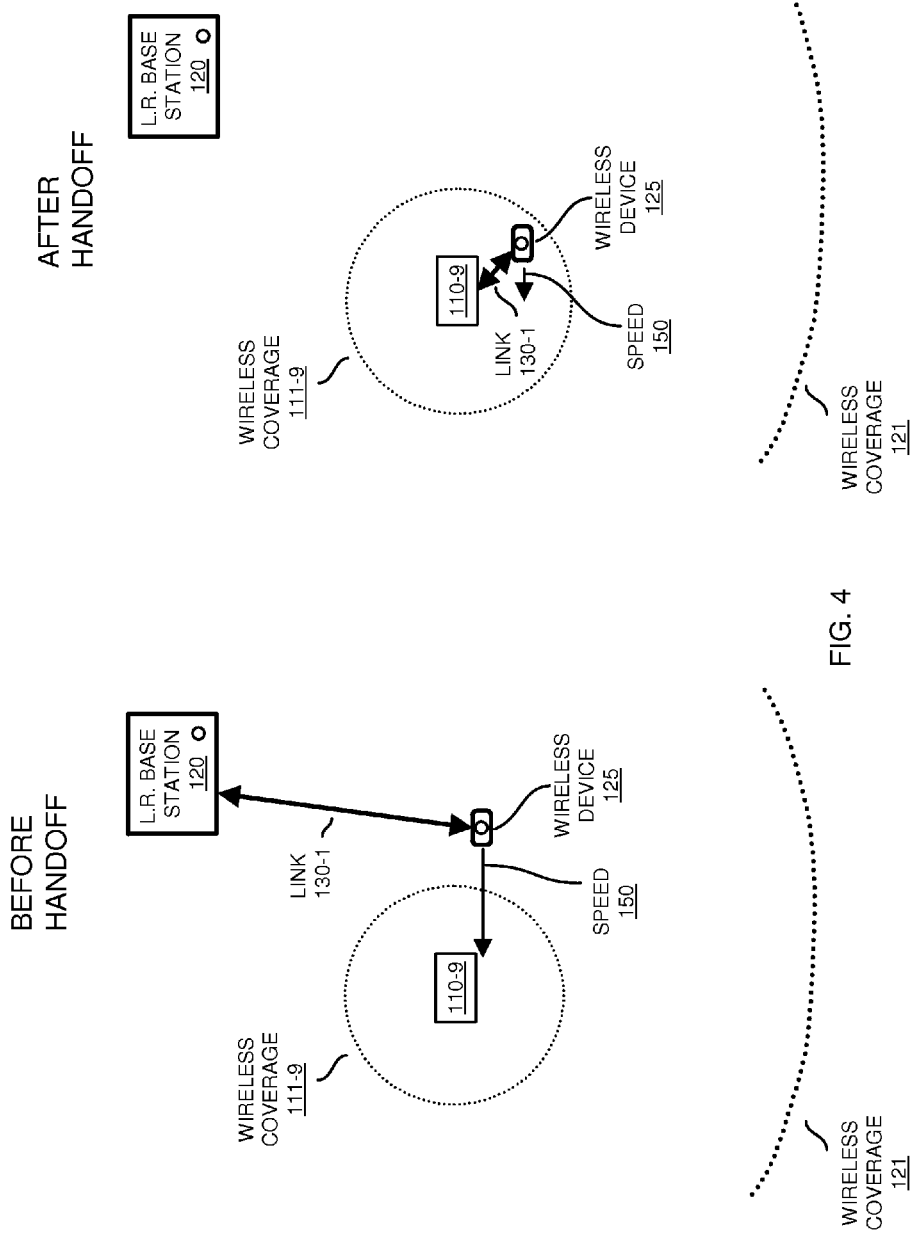

FIG. 4 is an example diagram illustrating handoff of a respective communication link when the speed of a respective speed of a wireless device is below a threshold value according to embodiments herein.

Assume in this example that the wireless device 125 moves at a relatively slow speed 150 (e.g., below a threshold value) in a vicinity of or through the wireless coverage 111-9 provided by the short-range base station 110-9. Because the speed 150 of the wireless device 125 is below a threshold value, the handoff manager 140 initiates a handoff to the short-range base station 110-9.

This latter case of initiating the handoff of the communication link 130-1 provides a better use of the available RF bandwidth because the wireless device will likely be within range of the short-range base station 110-9 for a longer period of time as it is moving relatively slowly. Subsequent to the handoff, the long-range base station 120 no longer needs to transmit a high power RF signal in the wireless coverage 121 region to communicate with wireless device 125. This affords a better use of the available RF spectrum.

Figure 5:
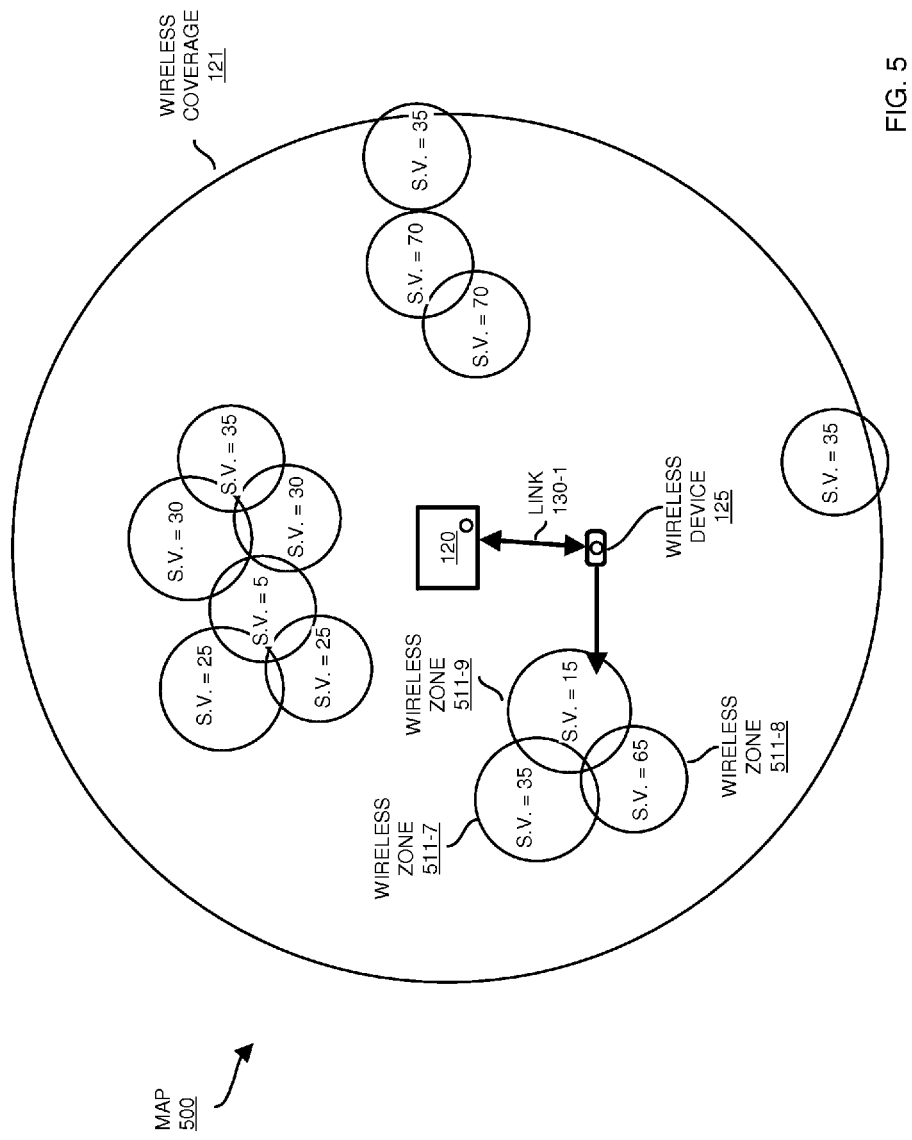
FIG. 5 is an example diagram illustrating a geographical map of speed information used to perform conditional handoffs of wireless links according to embodiments herein.

FIG. 5 is an example diagram illustrating use of a map 500 to selectively perform handoffs according to embodiments herein. Via use of map 500, it is not necessary to know the speed of the wireless device 125 to make a decision whether to perform a handoff. Instead, location information associated with the wireless device 125 can be used to make a decision as to whether to perform a handoff.

More specifically, in this example embodiment, the handoff manager 140 enables handoffs depending on a type of geographical region in which the wireless device resides or is near. That is, the map 500 indicates whether a wireless zone supports slow moving or fast moving subscribers. In one embodiment, the speed values for regions in the map 500 are based at least in part on historical speeds of wireless subscribers that operate their respective wireless devices in a vicinity of the location.

In one embodiment, each zone or region in the map 500 is assigned a speed value such as a value between 0 and 70 miles per hour. The speed value assigned to the respective geographical zone can indicate a maximum speed at which wireless subscribers typically move through the respective region.

As shown, wireless zone 511-7 has been assigned a speed value of 35 indicating that the maximum speed of subscribers is up to 35 miles per hour; wireless zone 511-8 has been assigned a speed value of 65 indicating that the maximum speed of subscribers is up to 65 miles per hour; wireless zone 511-9 has been assigned a speed value of 15 indicating that the maximum speed of wireless subscribers is up to 15 miles per hour; and so on.

In one embodiment, the wireless zones correspond to the region of wireless coverage provided by the respective base stations. For example, wireless zone 511-7 corresponds to wireless coverage 111-7 provided by short-range base station 110-7; wireless zone 511-8 corresponds to wireless coverage 111-8 provided by short-range base station 110-8; wireless zone 511-9 corresponds to wireless coverage 111-9 provided by short-range base station 110-9; and so on.

Wireless zone 511-8 can at least partially cover a highway having a high vehicle speed limit. Hence, the speed value (e.g., 65) assigned to the wireless zone 511-8 is relatively high. Wireless zone 511-9 can be limed to covering a city park and/or side streets having a relatively low vehicle speed limit. Hence, the speed value (e.g., 15) assigned to the wireless zone 511-9 is relatively low.

The handoff manager 140 can be configured to identify a location or whereabouts of the wireless device 125 in the network environment 100 in accordance with any suitable navigation monitoring technique. For example, the wireless device 125 can be configured to measure a strength of signals from nearby base stations to determine its general whereabouts; the wireless device 125 can include a GPS system to determine its whereabouts, one or more long-range base stations can calculate a location of the wireless device 125, etc.

In one embodiment, the handoff manager 140 maps received location information to a respective speed value in map 500. For example, assume in this example that the handoff manager 140 detects that the wireless device 125 is passing near or through the wireless zone 511-9 on map 500. Via the map 500 and knowledge of the whereabouts of the wireless device i125 in the network environment 100, the handoff manager identifies that the wireless zone 511-8 has been assigned a speed value of 15.

The handoff manager 140 selectively initiates a wireless handoff of the communication link 130-1 from a long-range base station 120 to a short-range base station based 110-9 based at least in part on a magnitude of the speed value retrieved from the mapping. For example, if the speed value indicates that subscribers typically or most often move slowly through the location or surrounding region, then the handoff manager can initiate a handoff of a communication link with the wireless mobile wireless device from the long-range base station to a nearby short-range base station.

In this example, the speed value of 15 is relatively low and sufficiently below a threshold value of 30 miles per hour. Accordingly, in this case, the handoff manager 140 initiates a handoff of the communication link 130-1 from the long-range base station 120 to the short-range base station 110-9 because the wireless device 125 enters a wireless zone in which the respective wireless device 125 is unlikely to move faster than a speed of 15 miles per hour. As previously discussed, note that whether to perform a handoff also can depend on the type of data transmitted on the communication link as discussed above.

Assume in this example that the wireless device 125 passes through wireless zone 511-9 and enters wireless zone 511-8. As previously discussed, in this example, the handoff manager 140 can detect a location of the wireless device 125 in a number of suitable ways. To determine whether to hand off the communication link 130-1 to the short-range base station 110-8, the handoff manager 140 retrieves a speed value for wireless zone 511-8. The speed value in wireless zone 511-8 is 65 miles per hour. In this case, the handoff manager 140 can be configured to prevent a handoff of the communication link 130-1 to the short-range base station 110-8 because the speed value of 65 is above the speed threshold value. In such an instance, the handoff manager 140 would initiate a handoff of the communication link 130-1 to the long-range base station 120.

In accordance with further embodiments, the mapping of the location of the wireless device 125 to a respective speed value in map 500 can include identifying a maximum allowable vehicle speed limit for vehicles operated in a vicinity of the location as specified by the map 500. As previously mentioned, the speed value retrieved from the map 500 indicates attributes of the location such as a speed limit of vehicles in or near the location, a typical, historical, and/or maximum speed of subscribers passing near or through the location, etc. In this example, handing off of a respective communication link 130-1 can depend on whether the maximum allowable vehicle speed limit for the region is above a threshold value.

In this way, the handoff manager 140 can initiate a handoff of a respective communication link 130-1 based on an anticipated maximum speed of the wireless device 125 (as specified by the map) through the wireless zones rather than another parameter such as the actual speed of the wireless device 125 when entering a respective wireless zone. There is no need to calculate actual speed.

Figure 6:
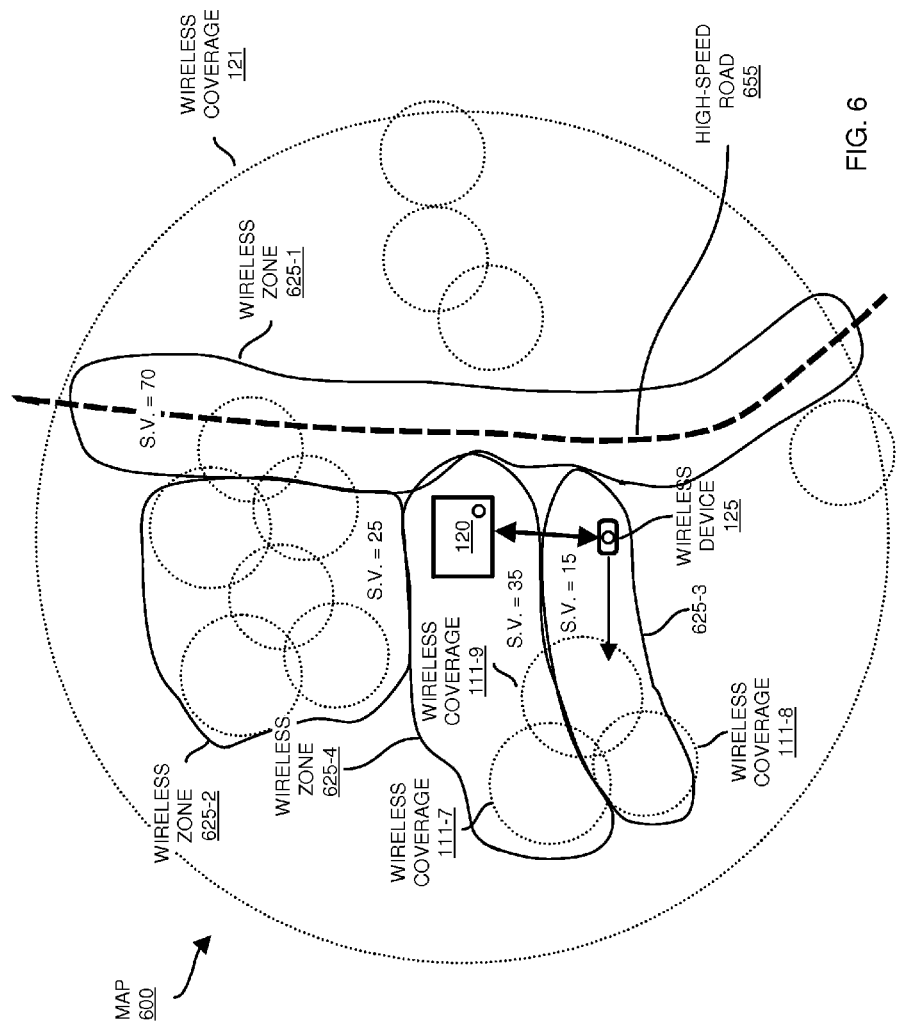
FIG. 6 is an example diagram illustrating a map of speed information used to perform conditional handoffs of wireless links according to embodiments herein.

FIG. 6 is an example diagram illustrating geographical partitioning of a region according to embodiments herein. As shown, the wireless zones 625 are not defined by respective wireless coverage provided by the short-range base stations. Instead, the wireless zones are partitioned depending on a typical speed of traveling wireless subscribers. The wireless zones may include portions of wireless coverage provided by one or more short-range base stations.

In this example, wireless zone 625-1 includes a high-speed road 655 such as an interstate highway. Accordingly, wireless zone 625-1 is assigned a speed value of 70 miles per hour to indicate that subscribers typically travel up to 70 miles per hour in this region.

Assume that wireless zone 625-3 geographically covers a park, cemetery, etc. in which subscribers typically travel relatively slow. Accordingly, wireless zone 625-3 is assigned a speed value of 15 miles per hour to indicate that subscribers typically travel up to but generally no more than 15 miles per hour in this region. In a similar manner, based on respective characteristics, wireless zone 625-2 is assigned a speed value of 25; wireless zone 625-4 is assigned a speed value of 35, and so on.

Via use of map 600, the handoff manager 140 enables handoffs depending on a type of geographical region in which the wireless device resides, is near, passing through, etc. The different zones in map 600 indicate whether a respective wireless zone supports slow moving or fast moving subscribers.

As previously mentioned, the handoff manager 140 can be configured to identify a location or whereabouts of the wireless device 125 in the network environment 100. The handoff manager 140 can also be configured to map a received location of the wireless device 125 to a respective speed value in the map 600.

For example, assume in this example that the handoff manager 140 detects that the wireless device 125 is passing near or through the wireless zone 625-3 on map 600. The handoff manager 140 identifies that the wireless zone 625-2 has been assigned a speed value of 15 miles per hour. As previously mentioned, the speed value retrieved from the map 600 can indicate attributes of the location such as a speed limit of vehicles in or near the location, a typical, historical, and/or maximum speed of subscribers passing near or through the location, etc.

In this example, the handoff manager 140 selectively initiates a wireless handoff of the communication link 130-1 from a long-range base station 120 to a short-range base station based 110-9 based at least in part on a magnitude of the speed value retrieved from the mapping. For example, if the speed value indicates that subscribers typically or often move slowly through the wireless zone, then the handoff manager can initiate a handoff of a communication link 130-1 from the long-range base station 120 to a nearby short-range base station 110-9. In this example, when the wireless device 125 is in a vicinity of wireless coverage 111-9, the handoff manager 140 initiates a handoff of the communication link 130-1 to the short-range base station 110-9 because the speed value of 15 for wireless zone 625-3 is relatively low and sufficiently below a threshold value of, for example, 30 miles per hour.

As previously discussed, a handoff also can depend on the type of data transmitted on the communication link, type of application executed by a respective resource, etc.

Figure 7:
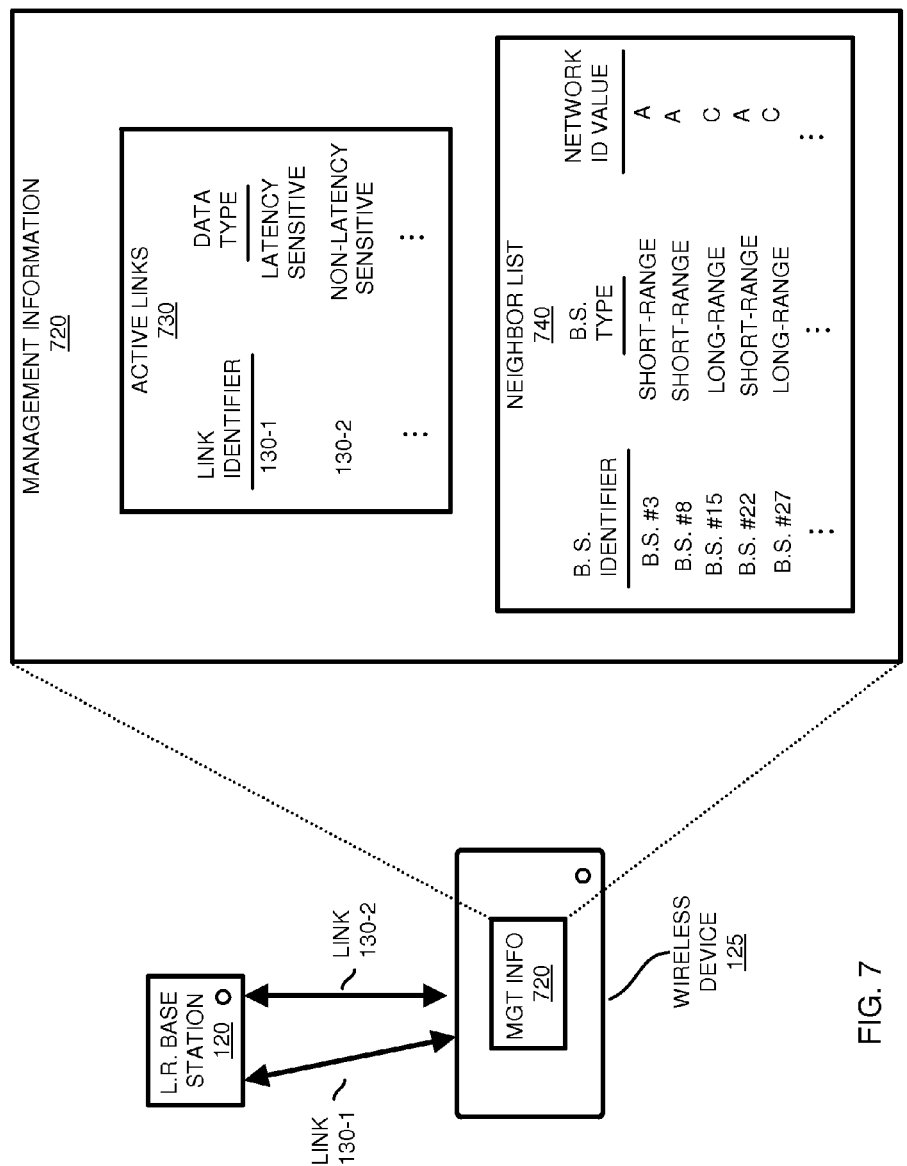
FIG. 7 is a diagram illustrating management information received by a wireless device according to embodiments herein.

FIG. 7 is an example diagram illustrating transmission and use of a neighbor list according to embodiments herein.

Wireless device 125 can be configured to store management information 720. In one embodiment, management information 720 indicates a list of active links 730 and corresponding types of transmitted data on the links.

Management information 720 further includes neighbor list 740 received from the long-range base station 120. The neighbor list 740 indicates one or more base stations (e.g., long-range base stations and short-range base stations) that are nearby candidate base stations in which to potentially handoff a communication link from long-range base station 120, with which the wireless device 125 is currently connected.

In one embodiment, via specific information in list 740, the long-range base station 120 provides notification to the wireless device 125 that: candidate base station #3 in the neighbor list 740 is a short-range base station in vicinity of the wireless device 125; candidate base station #8 in the neighbor list 740 is a short-range base station in vicinity of the wireless device 125; candidate base station #15 in the neighbor list 740 is a long-range base station in vicinity of the wireless device 125; candidate base station #22 in the neighbor list 740 is a short-range base station in vicinity of the wireless device 125; and so on.

Thus, the neighbor list 740 indicates a set of base stations (e.g., short-range base stations and long-range base stations) that are in close proximity to the wireless device 125 as it moves through the network environment 100. Via respective base station identifiers in the list and corresponding type information, the wireless device 125 is able to identify which nearby base stations support short-range communications and which nearby base stations supports long-range communications.

As discussed herein, the handoff manager 140 in the wireless device 125 can be configured to determine whether to initiate a handoff to another base station in the list 740. For example, the handoff manager 140 can detect when the wireless device 125 moves in the vicinity of coverage provided by another base station. In one embodiment, the handoff manager 140 tests whether the wireless device 125 receives a sufficiently strong signal from other nearby base stations as specified in the neighbor list 740 to determine whether to perform a handoff.

If the signal strength of a base station in the list 740 is sufficient and thus appears to be a good handoff candidate, the wireless device 125 can perform further processing (as previously discussed) to determine whether to initiate a handoff request. For example, in one embodiment, the handoff manager 140 in the wireless device 125 selectively initiates a request to handoff the communication link 130-1 to a short-range base station 110-9 as specified in the list 740 depending on one or more handoff criteria such as speed of the wireless device 125 through the network environment 100, type of data transmitted on an active link (e.g., communication link 130-1) between the wireless device 130 and a respective base station in the network environment 100, typical maximum speed or speed limit value of subscribers in a vicinity of the wireless device 125, etc., as discussed above.

In this example, in response to receiving the request for handoff from the wireless device 125, the long-range base station 120 proceeds with a handoff of the communication link 130-1 to a short-range base station selected from the list 740.

Thus, forwarding of the base station identifier values and respective base station types information from the long-range base station 120 (or other resource) to the wireless device 125 enables the wireless device 125 to perform appropriate decision making as to whether to request a handoff to a short-range base station.

In a yet further embodiment, note that handoff techniques as discussed herein can depend on at least in part on ownership, control, etc., of different resource layers in a wireless network environment. For example, a first company may control (e.g., own, operate, etc.) one or more long-range base stations in a first network layer. At a wireless network layer such as a second layer beneath the first layer, a second company may control (e.g., own, operate, etc.) one or more short-range base stations that operate within a vicinity of coverage provided by a given long-range base station controlled by the first company in the first layer.

In this example, assume that the first company (assigned network identifier C) controls long-range base station #15, long-range base station #27, etc. Further, assume that the second company (assigned network identifier A) controls short-range #3, short-range base station #8, short-range base station #22, etc.

A wireless subscriber operating wireless device 125 may pay a subscriber fee to the second company to use the base stations at the second layer. Embodiments herein can include an agreement (e.g., a roaming agreement) between the first company and second company such that wireless device 125 can connect to any of the long-range base stations at the first layer (e.g., base stations controlled by the first company) when a respective link cannot be made or is not desired between the wireless device 125 and a respective short-range base station controlled by the second company at the second layer.

Note that the second company may pay a usage fee to the first company for wireless services between the wireless device 125 and the first network layer (e.g., a layer including the long-range base stations controlled by the first company) such that the wireless device 125 can connect to any base station at the first layer. This fee for use of one or more base stations in the first layer can be passed on to the user of the wireless device.

To reduce the cost of using the long-range base station in the first network layer as controlled by the first company, embodiments herein can include forcing the wireless device 125 to handoff to a respective short-range base station or maintaining a connection with a base station in the second network layer (as controlled by the second company) when possible even if a connection between the wireless device 125 and a long-range base station in the first network layer would provide a better link with the wireless device 125. As long as short-range base stations in the second layer provide acceptable link quality with the wireless device 125, the wireless device 125 stays connected with the second network layer as opposed to switching to the first network layer.

As discussed herein, a handoff from a short-range base station to a long-range base station can be made in cases in which the wireless device 125 and the network supports latency sensitive data traffic or in cases in which a speed of the wireless device 125 is above a threshold value.

In addition to including a base station type identifier (e.g., to indicate whether a base station is a long-range or short-range base station) in a neighbor list 740 as previously discussed, embodiments herein can include providing network identifier values. As discussed above, each network identifier value in the neighbor list 740 indicates to which network or entity a respective base station resource belongs.

For example, a network identifier value can indicate a company that controls the respective base station. The wireless device 125 or other network equipment in the wireless network environment can be configured to make handoff decisions based at least in part on whether the base station resource in the neighbor list 740 is part of the network to which the wireless device 125 is subscribed. In one embodiment, if the wireless device 125 is subscribed to the use resources of the second company, the wireless device 125 relies on or uses a link between the wireless device 125 and a base station controlled by the second company even if a base station controlled by a first company provides a better quality link.

Note that each level of the wireless network environment can include base station resources controlled by one or more different entities. For example, a first network layer of multiple long-range base stations may be controlled by a number of different companies; a second network layer may include multiple short-range base stations controlled by a number of different companies; etc. The wireless device 125 can include neighbor list 740 indicating a layer (e.g., whether a base station is long-range or short-range) at which a respective base station resource resides (e.g., base station #3 is a short-range base station; base station #8 is a short-range base station; base station #15 is a long-range base station; base station #22 is a short-range base station; base station #27 is a long-range base station; etc.). In such an embodiment, the wireless device 125 can initiate connectivity with a respective base station resource depending on whether the subscriber is already subscribed to the network (e.g., company) to which the base station resource belongs.

For example, in one embodiment, the wireless device 125 can retrieve network identifier information from the neighbor list 740. The network identifier information indicates a respective network to which each base station in the set belongs. In accordance with such an embodiment, as specified by the network identifier information, network identifier A indicates which base stations belong to network A; network identifier B indicates which base stations belong to network B, network identifier C indicates which base stations belong to network C; and so on.

As mentioned, the wireless device 125 utilizes the network identifier information in the neighbor list 740 to identify that a particular short-range base station such as base station #3 is controlled by a network (e.g., network A) to which a user of the wireless device subscribes. That is, assume that the use of wireless device 125 subscribes to use of network A, although the wireless device 125 can also connect to different networks such as network B, network C, etc., as needed or desired.

In this example, the wireless device 125 initiates the handoff of one or more communication links 130 from the long-range base station to the particular short-range base station (e.g., base station #3) because it is within the network A to which the wireless device 125 subscribes. The wireless device 125 can be configured to prevent a handoff to base station #8 or base station #15 unless it is needed to maintain connectivity between the wireless device 125 and a base station.

Thus, handoffs from one base station to another can depend on whether the base station is part of a network to which the user of the wireless device 125 is subscribed.

Figure 8:
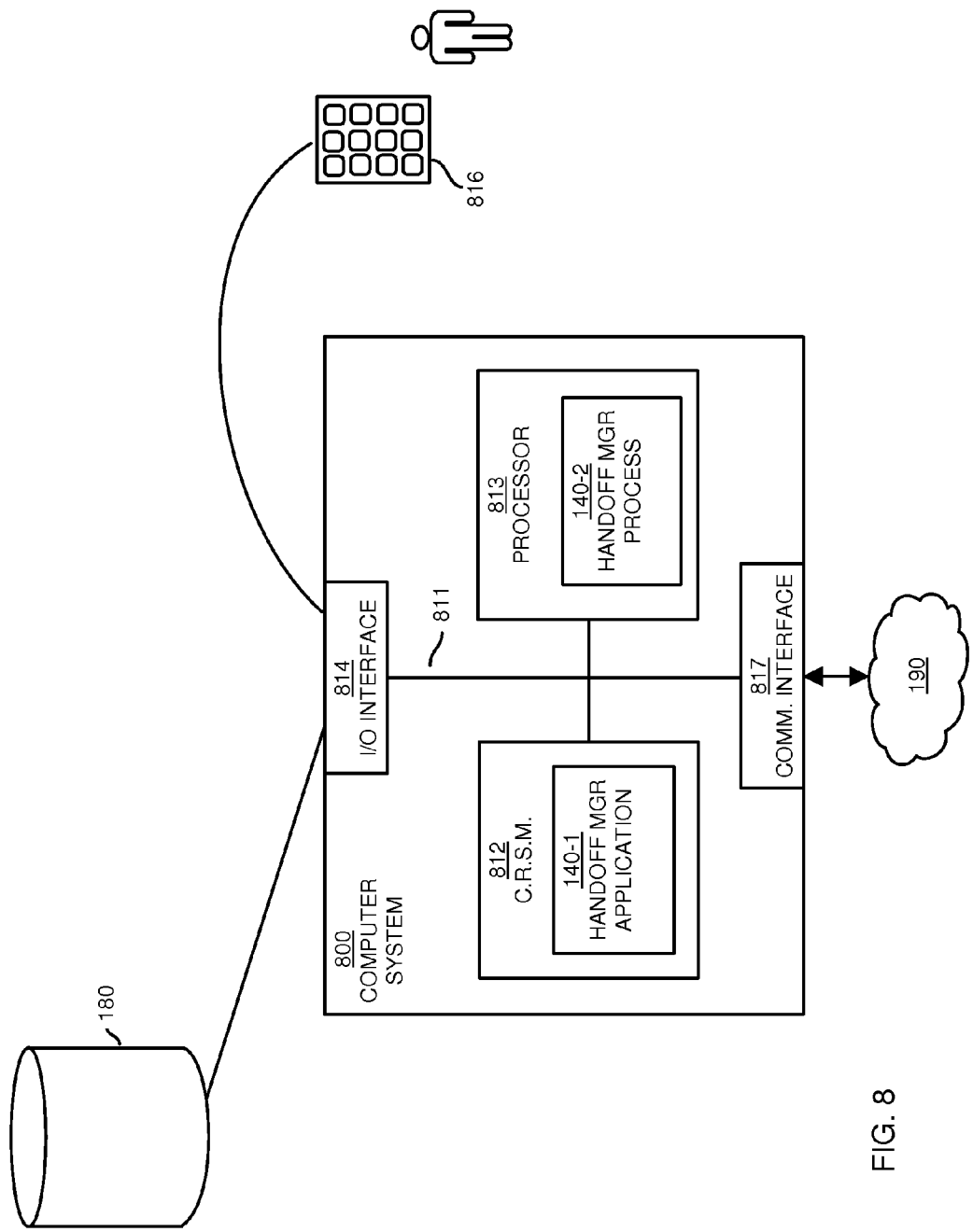
FIG. 8 is a diagram illustrating an example hardware architecture including a processor and encoded hardware storage medium to execute according to embodiments herein.

FIG. 8 is an example block diagram of a computer system 800 for implementing any of the operations according to embodiments herein.

Computer system 800 can be or include one or more computerized devices such as a cellular phone, microprocessor, base station, personal computer, workstation, portable computing device, console, network terminal, processing device, network device, etc.

As shown, computer system 800 of the present example can include an interconnect 811 that couples computer readable storage media 812 such as a non-transitory type of media (i.e., any type of hardware storage medium) in which digital information can be stored and retrieved, a processor 813, I/O interface 814, and a communications interface 817.

I/O interface 814 provides connectivity to a repository 180 and, if present, other devices such as display screen, keypad 816 of a cell phone, peripheral devices such as a keyboard, a computer mouse, etc.

Computer readable storage medium 812 can be any non-transitory storage device such as memory, optical storage, hard drive, floppy disk, etc. In one embodiment, the computer readable storage medium 812 stores instructions and/or data.

Communications interface 817 enables the computer system 800 and processor 813 to communicate over a resource such as network 190 to retrieve information from remote sources and communicate with other computers. I/O interface 814 enables processor 813 to retrieve or attempt retrieval of stored information such as models, etc., from repository 180.

As shown, computer readable storage media 812 is encoded with a handoff manager application 140-1 (e.g., software, firmware, etc.) executed by processor 813. Handoff manager application 140-1 can be configured to include instructions to implement any of the operations associated with handoff manager 140 as previously discussed.

During operation of one embodiment, processor 813 accesses computer readable storage media 812 via the use of interconnect 811 in order to launch, run, execute, interpret or otherwise perform the instructions in handoff manager application 140-1 stored on computer readable storage medium 812.

Execution of the handoff manager application 140-1 produces processing functionality such as handoff manager process 140-2 in processor 813. In other words, the handoff manager process 140-2 associated with processor 813 represents one or more aspects of executing handoff manager application 140-1 within or upon the processor 813 in the computer system 800.

Those skilled in the art will understand that the computer system 800 can include other processes and/or software and hardware components, such as an operating system that controls allocation and use of hardware resources to execute handoff manager application 140-1.

In accordance with different embodiments, note that computer system may be any of various types of devices, including, but not limited to, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 800 may reside at any location in network environment 100 to implement functionality as discussed herein.

Functionality supported by the handoff manager 140 and resources therein will now be discussed via flowcharts in FIGS. 9-12. Note that the steps in the flowcharts below can be executed in any suitable order.

Figure 9:
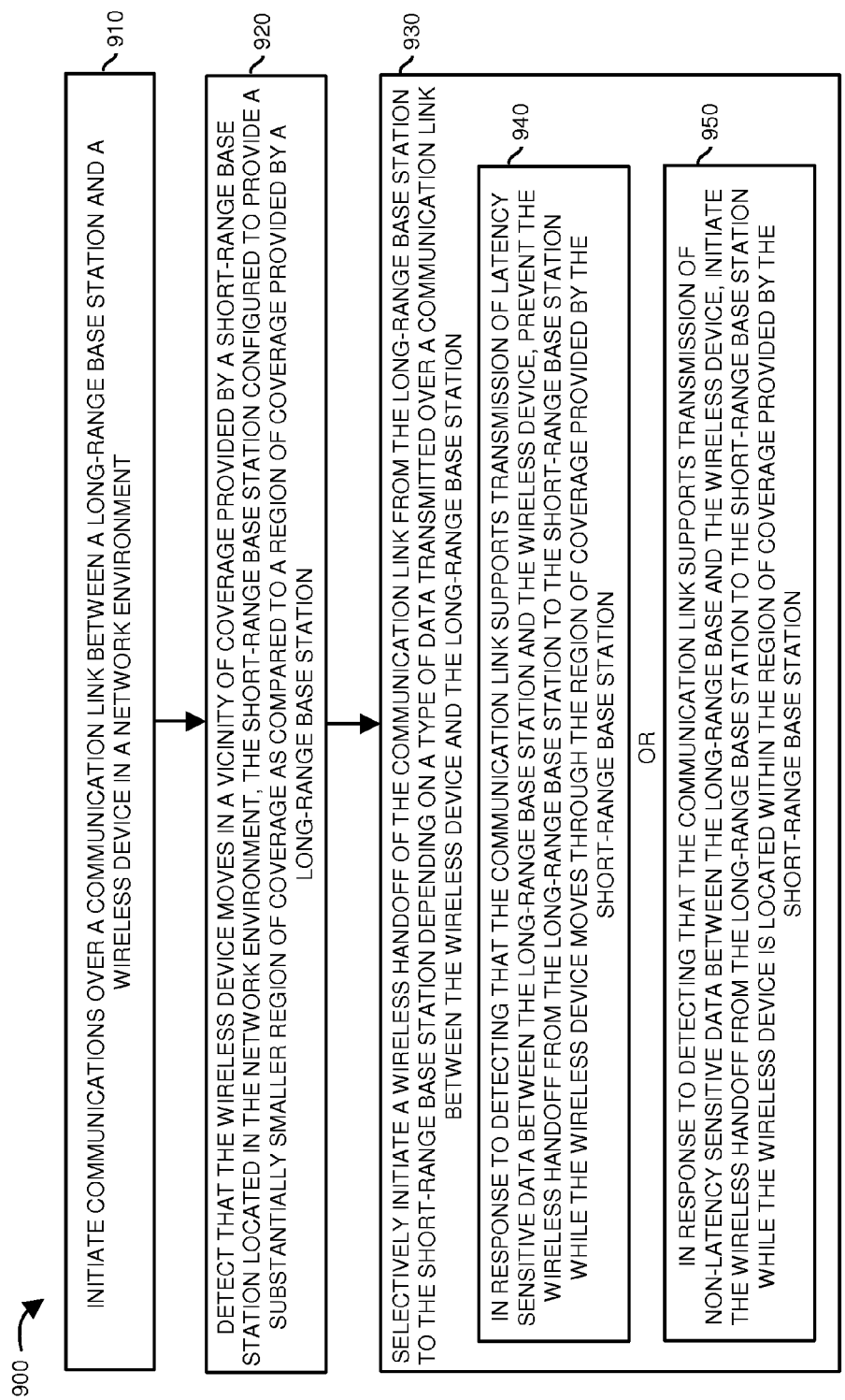
FIGS. 9-12 are flowcharts illustrating example methods according to embodiments herein.

FIG. 9 is a flowchart 900 illustrating an example method of implementing conditional handoffs in a network environment according to embodiments herein. As previously discussed, the handoff manager 140 can be executed by any of one or more resources such as a base station, mobile wireless device, and/or a combination of both. Note that there will be some overlap with respect to concepts as discussed above.

In step 910, the wireless device 125 and long-range base station 140 initiate communications with each other over one or more communication links 130.

In step 920, the handoff manager 140 detects that the wireless device moves in a vicinity of coverage provided by a short-range base station 110-9 located in the network environment 100. The short-range base station 110-9 is configured to provide a substantially smaller region of coverage as compared to a region of coverage provided by a long-range base station 120.

In step 930, the handoff manager 140 selectively initiates a wireless handoff of one or more communication links 130 from the long-range base station 120 to the short-range base station 110-9 depending on a type of data transmitted over communication links 130 between the wireless device 125 and the long-range base station 120.

In sub-step 940 associated with step 930, in response to detecting that the communication link 130-2 supports transmission of latency sensitive data between the long-range base station 120 and the wireless device 125, the handoff manager 140 prevents the wireless handoff of communication link 130-2 from the long-range base station 120 to the short-range base station 110-9 while the wireless device moves through the region of wireless coverage provided by the short-range base station 110-9.

As an alternative to executing sub-step 940, in sub-step 950 associated with step 930, in response to detecting that the communication link 130-1 supports transmission of non-latency sensitive data between the long-range base station 120 and the wireless device 125, the handoff manager 140 initiates the wireless handoff of communication link 130-1 from the long-range base station 120 to the short-range base station 110-9 while the wireless device 125 is located within the region of coverage provided by the short-range base station 110-9.

Figure 10:
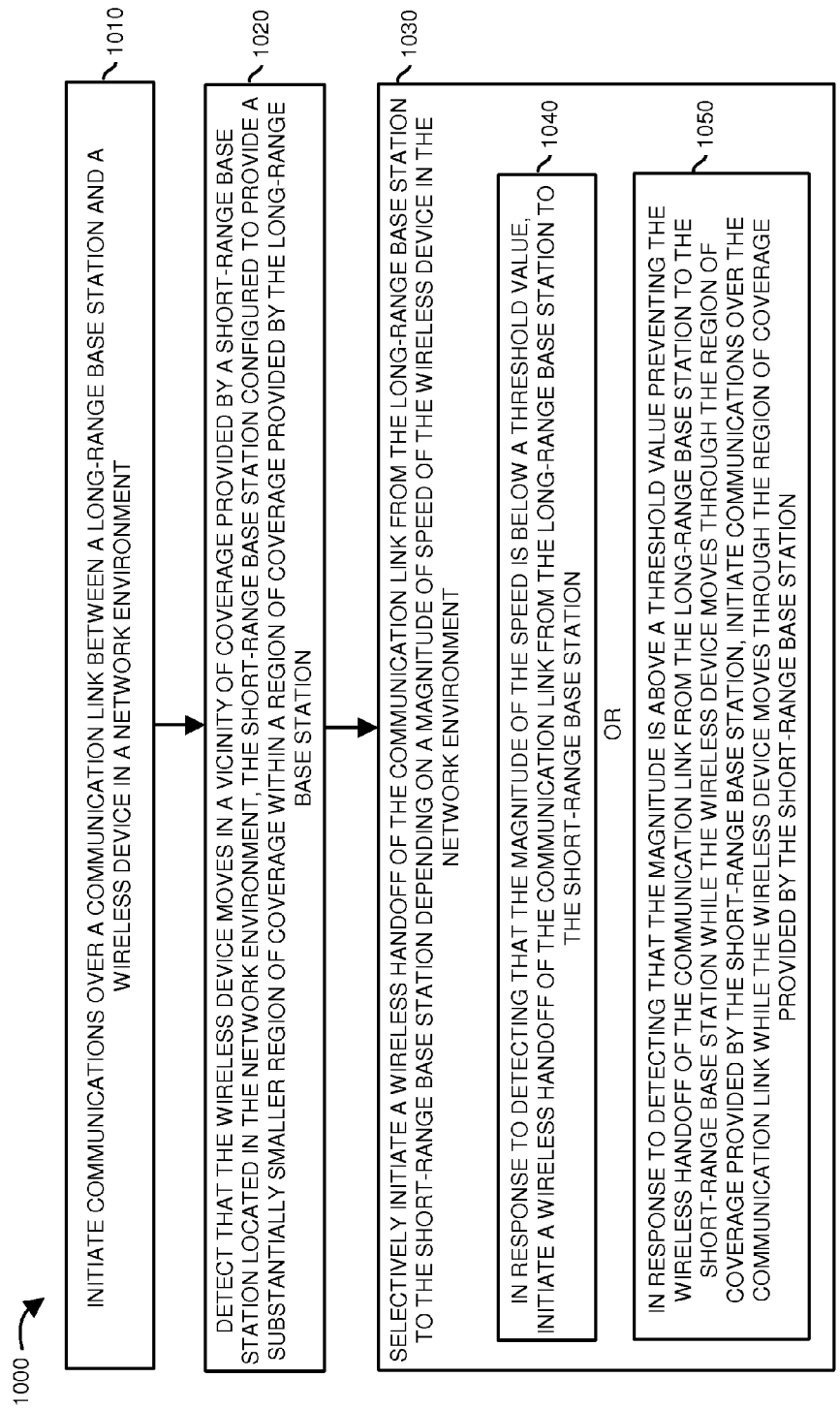

FIG. 10 is a flowchart 1000 illustrating an example method of implementing conditional handoffs in a network environment according to embodiments herein.

In step 1010, the wireless device 125 and long-range base station 140 initiate communications over one or more communication links 130.

In step 1020, the handoff manager 140 detects that the wireless device 125 moves in a vicinity of coverage provided by a short-range base station 110-9 located in the network environment 100. The short-range base station 110-9 is configured to provide a substantially smaller region of coverage within a region of coverage provided by the long-range base station 120.

In step 1030, the handoff manager 140 selectively initiates a wireless handoff of the communication link 130-1 from the long-range base station 120 to the short-range base station 110-9 depending on a magnitude of speed 150 of the wireless device 125 in the network environment 100.

In sub-step 1040 associated with step 1030, in response to detecting that the magnitude of the speed is below a threshold value, the handoff manager 140 initiates a wireless handoff of the communication link 130-1 from the long-range base station 120 to the short-range base station 110-9.

Figure 11:
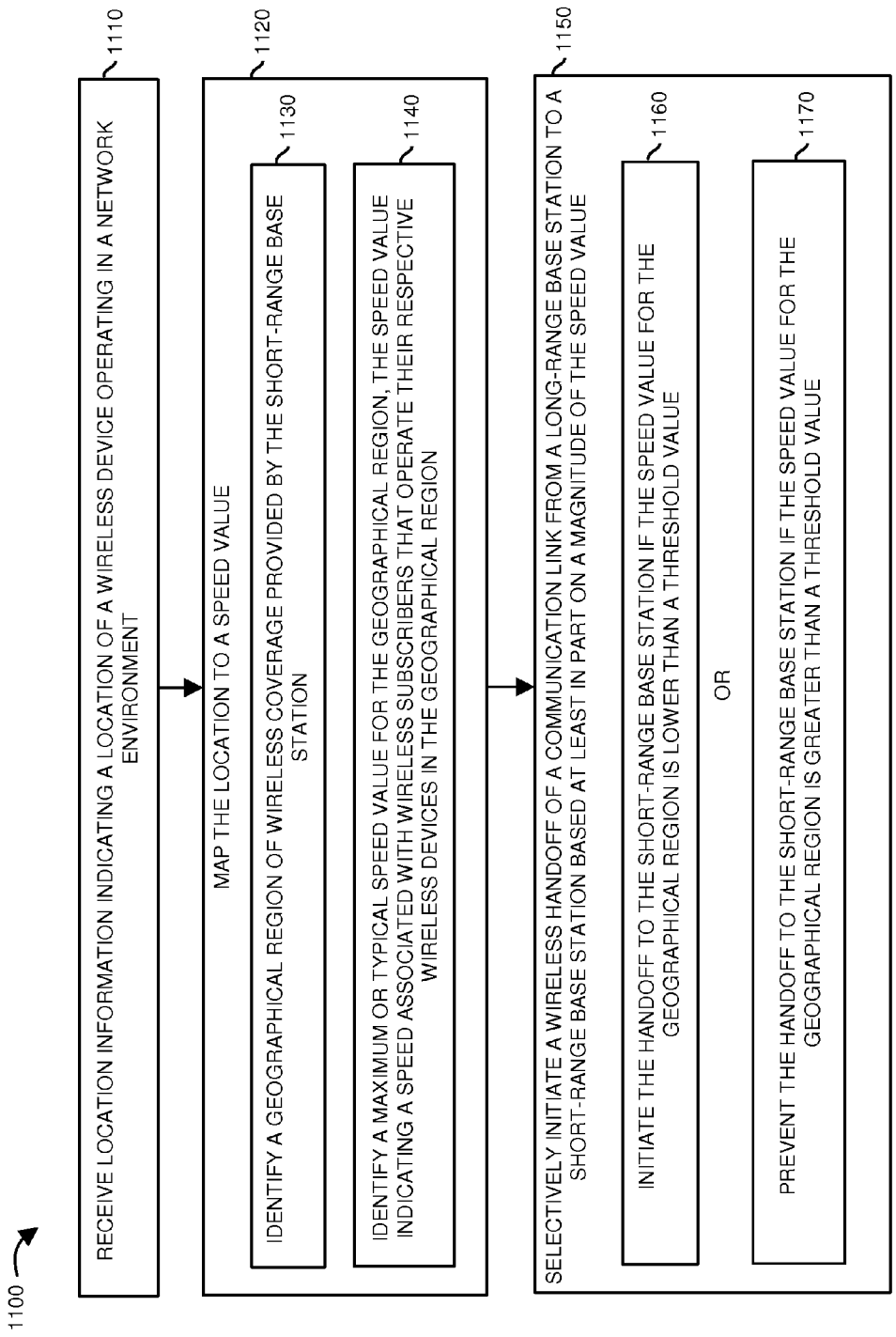

As an alternative to sub-step 1040, in sub-step 1050, in response to detecting that the magnitude is above a threshold value preventing the wireless handoff of the communication link from the long-range base station to the short-range base station while the wireless device moves through the region of coverage provided by the short-range base station, the handoff manager 140 initiates communications over the communication link while the wireless device moves through the region of coverage provided by the short-range base station FIG. 11 is a flowchart 1100 illustrating an example method of implementing conditional handoffs in a network environment based on speed information retrieved from a geographical map according to embodiments herein.

In step 1110, the handoff manager 140 receives location information indicating a location of a wireless device 125 operating in a network environment 100.

In step 1120, the handoff manager 140 maps the location to a speed value.

In sub-step 1130, the handoff manager 140 identifies a geographical region of wireless coverage provided by the short-range base station 110-9.

In sub-step 1140, the handoff manager 140 identifies a maximum or typical speed value for the geographical region. The speed value retrieved from the map indicates a speed associated with wireless subscribers that operate their respective wireless devices in the geographical region.

In step 1150, the handoff manager 140 selectively initiates a wireless handoff of a communication link from a long-range base station 120 to a short-range base station based at least in part on a magnitude of the speed value retrieved from the map.

In sub-step 1160, the handoff manager 140 initiates the handoff to the short-range base station 110-9 if the speed value for the geographical region is lower than a threshold value.

As an alternative to sub-step 1160, in sub-step 1170, the handoff manager 140 prevents the handoff to the short-range base station 110-9 if the speed value for the geographical region is greater than a threshold value.

Figure 12:
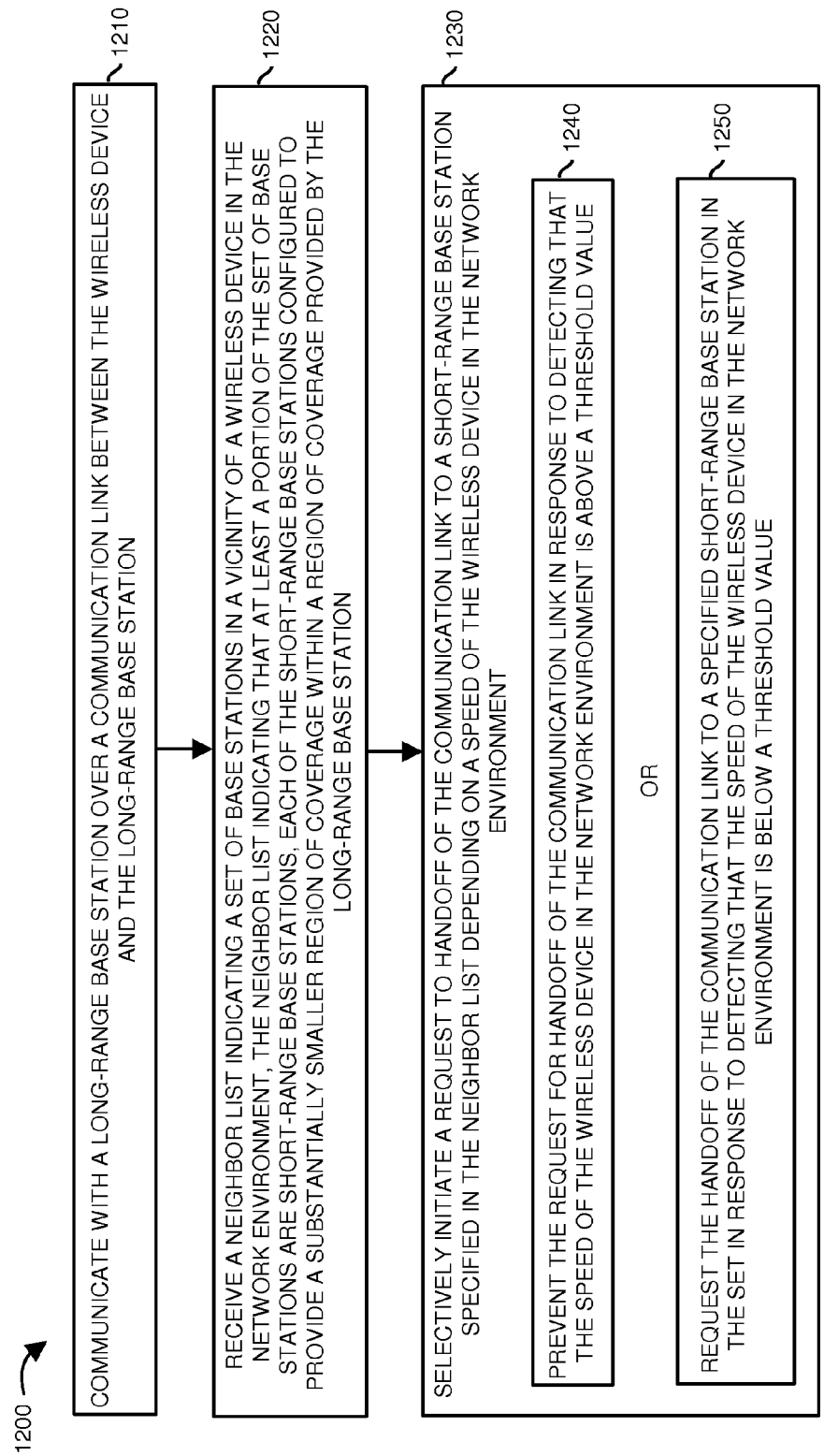

FIG. 12 is a flowchart 1200 illustrating an example method of implementing conditional handoffs in a network environment according to embodiments herein. As previously discussed, the handoff manager as discussed below can be executed by any of one or more resources such as a base station, mobile wireless device, and/or a combination of both. Note that there will be some overlap with respect to concepts as discussed above.

In step 1210, the wireless device 125 and long-range base station 140 initiate communications over one or more communication links 130.

In step 1220, the handoff manager 140 receives a neighbor list 740 indicating a set of base stations in a vicinity of wireless device 125 in the network environment 100. Via base station identifiers in the list 740, the neighbor list 740 indicates at least one short-range base station.

In step 1230, the handoff manager 140 selectively initiates a request to handoff of a communication link to a short-range base station specified in the neighbor list 740 depending on criteria such as a speed of the wireless device 125 in the network environment 100.

In sub-step 1240, the handoff manager 140 prevents the request for handoff of the communication link in response to detecting handoff criteria such as that the speed of the wireless device 125 in the network environment 100 is above a threshold value.

As an alternative to sub-step 1240, the handoff manager 140 requests the handoff of the communication link to a specific short-range base station selected from the list 740 in response to detecting handoff criteria such as that the speed of the wireless device 125 in the network environment 100 is below a threshold value.

Note again that techniques herein are well suited for use in wireless network environments supporting handoffs of communication links. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
   initiating communications over a communication link between a long-range base station and a wireless device in a network environment;
   detecting that the wireless device moves in a vicinity of coverage provided by a short-range base station located in the network environment, the short-range base station configured to provide a substantially smaller region of coverage as compared to a region of coverage provided by the long-range base station; and
   selectively initiating a wireless handoff of the communication link from the long-range base station to the short-range base station depending on a type of data transmitted over the communication link between the wireless device and the long-range base station,
   the method further comprising:
   identifying a corresponding geographical region in which the wireless device resides;
   mapping the corresponding geographical region to a speed value, the speed value indicating a rate at which subscribers typically travel through the corresponding geographical region; and
   wherein selectively initiating the wireless handoff of the communication link from the long-range base station to the short-range base station includes initiating the wireless handoff from the long-range base station to the short-range base station in response to detecting that the speed value assigned to the geographical region is below a threshold speed value.

2. The method as in claim 1, wherein the short-range base station is one of multiple short-range base stations, each of which provide substantially smaller coverage within the coverage provided by the long-range base station, the method further comprising:
   while the wireless device moves through the region of coverage provided by the short-range base station:
   preventing a wireless handoff of the communication link from the long-range base station to the short-range base station; and
   maintaining the communication link between the wireless device and the long-range base station.

3. The method as in claim 1, wherein selectively initiating the wireless handoff includes:
   in response to detecting that the communication link supports transmission of latency sensitive data between the long-range base station and the wireless device, preventing the wireless handoff from the long-range base station to the short-range base station while the wireless device moves through the region of coverage provided by the short-range base station.

4. The method as in claim 1, wherein selectively initiating the wireless handoff includes:
   in response to detecting that the communication link supports transmission of non-latency sensitive data between the long-range base and the wireless device, initiating the wireless handoff from the long-range base station to the short-range base station while the wireless device is located within the region of coverage provided by the short-range base station.

5. The method as in claim 1, wherein the communication link is a first communication link and the first communication link supports transmission of a first type of data between the long-range base station and the wireless device, the method further comprising:
   maintaining a second communication link between the long-range base station and the wireless device, the second communication link configured to support transmission of a second type of data;
   in response to detecting that the first type of data is latency sensitive data, preventing the wireless handoff of the first communication link from the long-range base station to the short-range base station; and
   in response to detecting that the second type of data is non-latency sensitive data, initiating a wireless handoff of the second communication link from the long-range base station to the short-range base station.

6. The method as in claim 1 further comprising:
forwarding a neighbor list from the long-range base station to the wireless device, the neighbor list indicating that both a first base station and a second base station are in a vicinity of the wireless device;
providing notification to the wireless device that the first base station in the neighbor list is a neighboring long-range base station in a vicinity of the wireless device and that the second base station in the neighbor list is a neighboring short-range base station in a vicinity of the wireless device; and
wherein detecting that the wireless device moves in the vicinity of coverage provided by the short-range base station includes receiving a request from the wireless device to perform the wireless handoff of the communication link from the long-range base station to the short-range base station, the short-range base station being the second base station identified in the neighbor list.

7. The method as in claim 1, wherein the coverage provided by the short-range base station is completely within the region of coverage provided by the long-range base station.

8. The method as in claim 1, wherein the coverage provided by the short-range base station resides completely within the region of coverage provided by the long-range base station; and
wherein selectively initiating the wireless handoff of the communication link from the long-range base station to the short-range base station includes: controlling whether to execute the wireless handoff depending on the type of data.

9. A method comprising:
identifying a location of a wireless device in a wireless network environment;
mapping the location to a speed value; and
selectively initiating a wireless handoff of a communication link with the wireless device from a long-range base station to a short-range base station based at least in part on the speed value;
wherein mapping the location to the speed value includes: detecting that the wireless device resides in a particular geographical region amongst multiple geographical regions, and identifying the speed value assigned to the particular geographical region.

10. The method as in claim 9, wherein the speed value is based at least in part on historical speeds of wireless subscribers that operate their respective wireless devices in a vicinity of the location.

11. The method as in claim 9, wherein mapping the location to the speed value includes identifying a maximum allowable vehicle speed limit for vehicles operated in a vicinity of the identified location; and
wherein selectively initiating the wireless handoff includes preventing the handoff of the communication link from the long-range base station to the short-range base station in response to detecting that the maximum allowable vehicle speed limit is above a threshold value.

12. The method as in claim 9, wherein mapping the location to the speed value includes:
identifying a geographical region of wireless coverage provided by the short-range base station;
identifying a maximum speed value for the geographical region, the maximum speed value indicating a maximum speed associated with wireless subscribers that operate their respective wireless devices in the geographical region; and
wherein selectively initiating the wireless handoff includes preventing the handoff to the short-range base station if the maximum speed value for the geographical region is greater than a threshold value.

13. A computer system comprising:
a processor; and
a hardware storage resource coupled to the processor, the hardware storage resource storing instructions that when executed by the processor cause the computer system to perform the operations of:
initiating communications over a communication link between a long-range base station and a wireless device in a network environment;
detecting that the wireless device moves in a vicinity of coverage provided by a short-range base station located in the network environment, the short-range base station configured to provide a substantially smaller region of coverage within a region of coverage provided by the long-range base station;
identifying a location of the wireless device in the network environment;
mapping the location to a speed value;
selectively initiating a wireless handoff of the communication link from the long-range base station to the short-range base station based at least in part on the speed value; and
wherein mapping the location to the speed value includes: detecting that the wireless device resides in a particular geographical region amongst multiple geographical regions, and identifying the speed value assigned to the particular geographical region.

14. The computer system as in claim 13, wherein the short-range base station is one of multiple short-range base stations, each of which provides substantially smaller coverage within the coverage provided by the long-range base station, the computer system further supporting operations of:
in response to detecting that a magnitude of the speed value is above a threshold value:
preventing the wireless handoff of the communication link from the long-range base station to the short-range base station while the wireless device moves through the particular geographical region.

15. The computer system as in claim 13, wherein the short-range base station is one of multiple short-range base stations, each of which provide substantially smaller coverage within the coverage provided by the long-range base station, the computer system further supporting operations of:
in response to detecting that a magnitude of the speed value is below a threshold value, initiating a wireless handoff of the communication link from the long-range base station to the short-range base station.

16. Non-transitory computer-readable storage having instructions stored thereon, the instructions, when carried out by a processing device, causes the processing device to perform operations of:
initiating communications over a communication link between a long-range base station and a wireless device in a network environment;
detecting that the wireless device moves in a vicinity of coverage provided by a short-range base station located in the network environment, the short-range base station configured to provide a substantially smaller region of coverage as compared to a region of coverage provided by a long-range base station; and
selectively initiating a wireless handoff of the communication link from the long-range base station to the short-range base station depending on a type of data transmitted over a communication link between the wireless device and the long-range base station;

identifying a corresponding region in which the wireless device resides;

mapping the corresponding geographical region to a speed value, the speed value indicating a rate at which subscribers typically travel through the corresponding geographical region; and wherein selectively initiating the wireless handoff of the communication link from the long-range base station to the short-range base station includes initiating the wireless handoff from the long-range base station to the short-range base station in response to detecting that the speed value assigned to the geographical region is below a threshold speed value.

17. The method as in claim 9, wherein selectively initiating the wireless handoff includes: in response to detecting that a magnitude of the speed value assigned to the particular geographical region is below a threshold speed value, handing off the communication link from the long-range base station to the short-range base station.

18. The method as in claim 17, wherein each corresponding geographical region of the multiple geographical regions is assigned a respective speed value; and wherein the respective speed value assigned to the corresponding geographical region is derived based at least in part on historical speeds of wireless subscribers that operate their respective wireless devices in the corresponding geographical region.

19. The method as in claim 17, wherein the speed value assigned to the particular geographical region represents an anticipated maximum speed of the wireless device rather than an actual measured speed of the wireless device through the particular geographical region.

* * * * *